United States Patent Office.

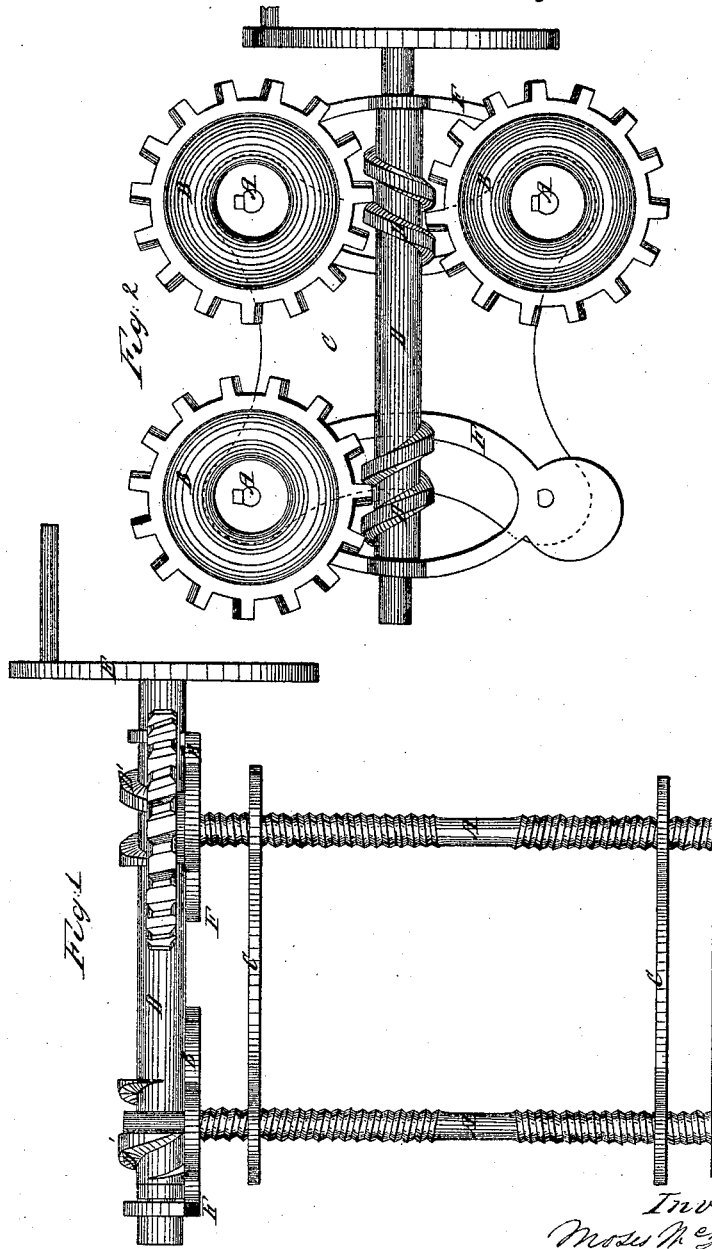

MOSES McELROY, OF SPRINGFIELD, ILLINOIS.

*Letters Patent No. 68,568, dated September 3, 1867.*

IMPROVEMENT IN HAY AND COTTON-PRESS.

*The Schedule referred to in these Letters Patent and making part of the same.*

TO ALL WHOM IT MAY CONCERN:

Be it known that I, MOSES McELROY, of Springfield, in the county of Sangamon, and State of Illinois, have invented a new and useful Improvement in Power-Presses for Compressing Tobacco, Hay, and Cotton, and other analogous uses; and I do hereby declare that the following is a full, clear, and exact description of the same, reference being had to the annexed drawings, making part of this specification, in which—

Figure 1 is a side elevation, and

Figure 2 is a plan view.

In both figures certain duplicated parts are in some places omitted, and the same letters are employed in the indication of the same parts in both figures.

Four rods A are placed in the four angles of a rectangle. These rods, as shown, are all vertical; but they may be horizontal. On each rod there is a screw chased on each end, those at one end of the rods being right-handed screws, and the ones at the opposite ends being left-handed. The size of the rods and the pitch of the screws must be determined according to the character of the work to be done. The spur-wheels B are securely and rigidly attached to the ends of these rods A. They are fitted with helical teeth to receive the threads D' of the endless screw D, which is turned by the wheel E, having levers attached to and projecting from its periphery, or in any other convenient manner. C C are the press-plates, through suitable female screws, in which the male screws upon the rods A pass. By turning the endless screw D in one direction, the press-plates, traversing their respective sets of screws, will be drawn towards one another, compressing any article placed between them. By reversing the revolution of endless screw, the press-plates, traversing their respective sets of screws, will be separated. A ratchet-wheel and pawl may be placed on the shaft of the endless screw to hold it and retain the press-plates in position when the pressure has been applied. The journals of the endless screw are formed upon the plates F F, which are set upon shoulders upon the rods A, which pass through the plates, and turn freely within the respective holes in the plates F F, through which they pass.

In setting up the rods it must be observed that, as the wheels B are set two of them on each side of the endless screw, those on one side will revolve from right to left, or in the direction of the hands of a clock, and the ones on the other side will revolve in the reverse direction; consequently the threads of the screws on one side must be also the reverse of those on the other, so that the plates C C will be made to traverse the screws towards or from one another, as may be required.

What I claim as my invention, and desire to secure by Letters Patent, is—

The hereinbefore-described arrangement of a double-platen power-press, consisting of the double screws upon the rods A, the double endless screws D D', spurs B, platens C C, and plates F F, forming bearings for the endless screw D, supported by shoulders upon the rods A, which pass through them, substantially as described.

In testimony whereof I have signed my name to this specification in the presence of two subscribing witnesses.

MOSES McELROY.

Witnesses:
   A. C. MOFFAT,
   HENRY BRITT.